Figure 1:
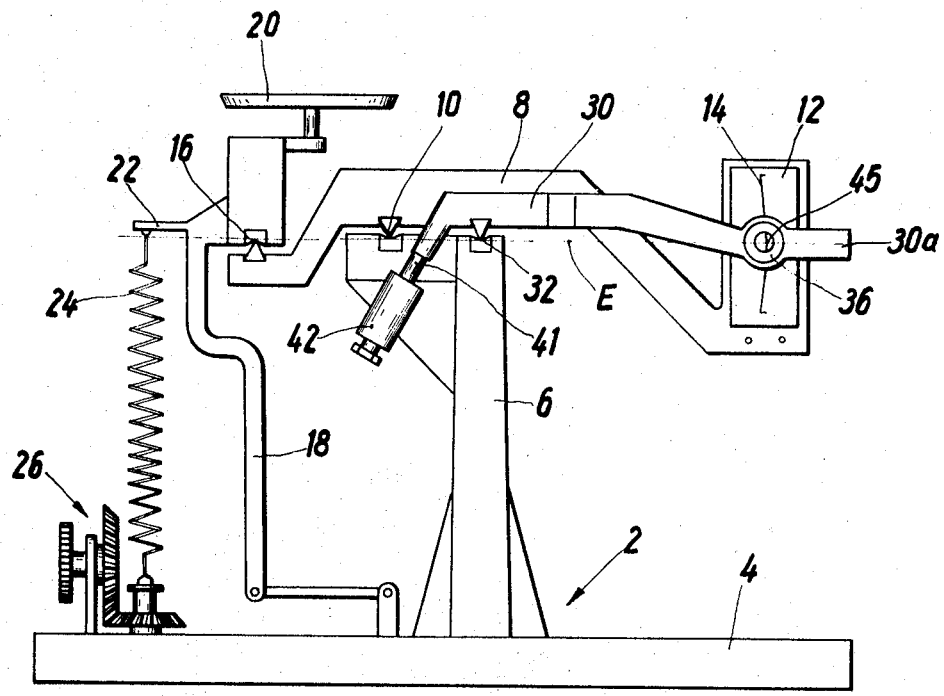

United States Patent
Weickhardt

[15] 3,661,222
[45] May 9, 1972

[54] BEAM BALANCE WITH A TARE SPRING AND A DEVICE FOR COMPENSATION OF LEVELLING ERRORS

[72] Inventor: Ludwig Weickhardt, Bovenden, Germany

[73] Assignee: Sartorius-Werke GmbH (und Vormals Gottinger Prazisionswaagenfabrik GmbH), Gottingen, Germany

[22] Filed: Feb. 5, 1971

[21] Appl. No.: 112,883

[30] Foreign Application Priority Data

Mar. 13, 1970 Germany..................P 20 11 912.4

[52] U.S. Cl. ............................................177/178, 177/216
[51] Int. Cl. .......................................................G01g 23/32
[58] Field of Search..............177/164, 173, 178, 216, DIG. 6

[56] References Cited

UNITED STATES PATENTS 3,566,983   3/1971   Weickhardt........................177/178 X

*Primary Examiner*—Richard B. Wilkinson
*Assistant Examiner*—George H. Miller, Jr.
*Attorney*—Edmund M. Jaskiewicz

[57] ABSTRACT

A beam balance has a tare spring acting upon a beam upon which is mounted a microscale a section of which can be projected on a screen by a projecting device whose lens is mounted on a pendulum arm. The pendulum arm has an effective length less than that of the beam arm and is pivotable about an axis located outside of the beam axis and parallel thereto. The beam balance has a device for the compensation of levelling errors. The effective length of the pendulum arm and the position of its supporting axis are such that any tipping of the balance stand about an axis parallel to the beam supporting axis brings about equal displacement of the entire pendulum and microscale screen in directions parallel to each other.

2 Claims, 3 Drawing Figures

PATENTED MAY 9 1972     3,661,222

SHEET 1 OF 2

BEAM BALANCE WITH A TARE SPRING AND A DEVICE FOR COMPENSATION OF LEVELLING ERRORS

The invention relates to a beam balance whose beam is subjected to the effect of a tare spring and carries a microscale, of which a section can be projected on a picture plane by means of a projecting device, and wherein at least the lens of the projecting device is attached on a pendulum arm, whose effective length is smaller than that of the beam arm, and which is pivotable about an axis arranged outside of the beam axis and parallel thereto, and wherein the beam balance is provided with a device for the compensation of levelling errors.

In a beam balance with no tare spring (representing a tare load) acting on the beam and having the projecting device, i.e., light source, condenser and projecting lens fixedly arranged on the balance frame, an indication error will result when the balance is tipped about the axis of the beam. Namely, the beam retains its horizontal position independently of the tipping of the balance frame. Therefore, the projecting device will move together with the balance frame upward or downward in relation to the microscale which does not move and the microscale section projected on a ground-glass screen is shifted to a certain extent. An indication error thus results.

In the case of an inclination pendulum balance, it is known (German Pat. No. 642,768) to provide a further pendulum in addition to the inclination pendulum that carries a projection device and the further pendulum carries the scale. The two pendulums are pivotable about axes that are aligned in relation to each other and the effective lengths of the two pendulum arms are equal. When such a balance is tipped about the common axes of the pendulums, the two pendulums retain their position in space and the projection image is not changed. In this manner, levelling errors can be compensated automatically in a balance that does not possess a tare spring.

On the other hand, if there is a tare spring which is effective between the beam and the balance stand, the beam no longer remains stationary when the balance stand is tilted about the axis of the beam. This can be made clear with the aid of the following imaginary experiment: One can imagine that the beam is held by hand in its original position while the balance stand is tipped about the axis of the beam so that the tare spring is elongated to a certain extent. This increases the force of the spring. If the balance beam is then released, it swings to a certain extent in the direction of tipping of the balance frame under the effect of the increased force of the tare spring which again becomes somewhat shorter. Finally, an equilibrium state is established. Here the beam was pivoted by an angle which is smaller than the pivoting angle of the balance frame. Corresponding conditions will prevail for the tipping in the opposite direction. Here also the beam is turned in the direction of tipping of the scale frame but by a smaller angle.

The above-described arrangement of the German Pat. No. 642,768 cannot be used for the compensation of levelling errors in the case where a tare spring is used since the pendulum carrying the projecting lens would retain its position in space when the balance frame is tilted. However, the microscale would be displaced together with the beam under the effect of the tare spring so that the projecting image on the ground-glass screen would be displaced and an indication error would result.

It would be possible to subject also the pendulum arm to the effect of a spring that corresponds to the tare spring of the beam, and to displace such a spring together with the tare spring. However, the expense of such an arrangement would be considerable.

The balance mentioned at the outset is already known (Swiss Pat. No. 445,882) wherein the effective length of the pendulum arm is smaller than the effective length of the beam arm and the pendulum arm is subjected to an additional force which is effective between the pendulum arm and the balance frame. This additional force may consist of a spring force or the attraction of two magnets. In each case, the additional force must be adjustable which requires additional structure.

The object of the present invention is to provide a beam balance having automatic level compensation without the application of an additional force or additional device.

According to the present invention, the above object is attained in the beam balance mentioned at the outset by selecting the effective length of a pendulum arm and the position of its supporting axis such that, in the case of a tipping of a balance frame about an axis parallel to a supporting axis of the beam, the entire pendulum and a microscale plate are displaced by identical distances in directions parallel to each other.

When the balance frame is tilted, all the points of the balance situated outside of the axis of tilting are turned around the axis, i.e., lifted or lowered generally. This is true also for the supporting axis of the beam. Now, the present invention proceeds from a simplified but exact method of consideration, namely, from the assumption that the balance frame is tilted about the supporting axis of the beam, i.e. that this axis does not move in the space. The admissibility of this assumption will be explained below. If the pendulum axis extends in parallel but displaced laterally, in relation to the supporting axis of the beam and if the balance frame is then tilted about the supporting axis of the beam, the pendulum axis is pivoted about the supporting axis of the beam generally lifted or lowered. Merely through this, the desired level compensation can be obtained, if the pendulum axis is brought into such a position with respect to the beam supporting axis and the pendulum is given such an effective length that the lens is always displaced by the same amount and substantially in the same direction as the microscale, when the balance frame is tilted.

In every case, the "effective length" of the beam arm and of the pendulum arm is to indicate the distance of their supporting axis to the optical axis, which passes through the lens and the microscale.

The present invention resides already in the presentation of the problem. In one solution of this problem the pendulum supporting axis is situated at least approximately in a common plane passing through the beam supporting axis and an optical axis, the optical axis traversing a microscale and the portion of the projecting device attached to the pendulum in that a level compensation is attained by observing the following requirements:

$$\frac{b}{a} \cdot \frac{G \cdot s}{C \cdot t^2} + 1$$

wherein:
- $a$ = the distance between beam supporting axis and pendulum supporting axis,
- $b$ = the effective length of beam,
- $C$ = the spring constant of the tare spring,
- $G$ = the weight of the beam,
- $s$ = the distance between beam supporting axis and center of gravity of the beam,
- $t$ = the distance between the beam supporting axis and point of engagement of the tare spring force on the beam.

Figure 2:
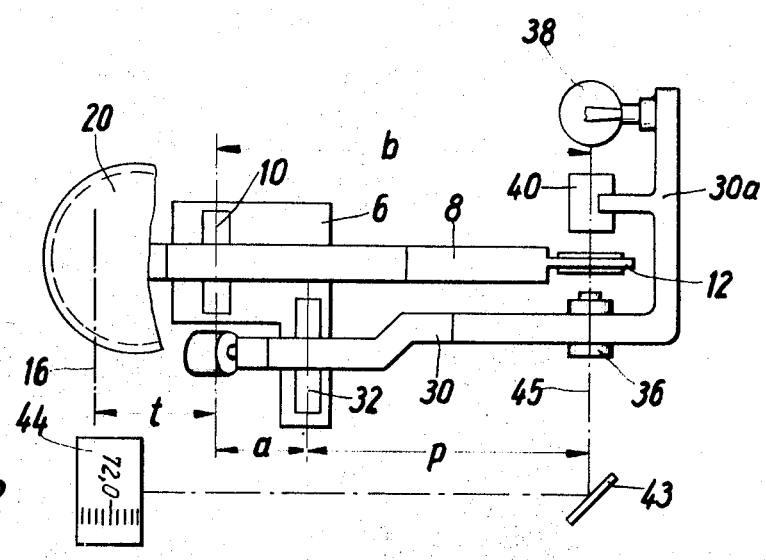
Figure 3:
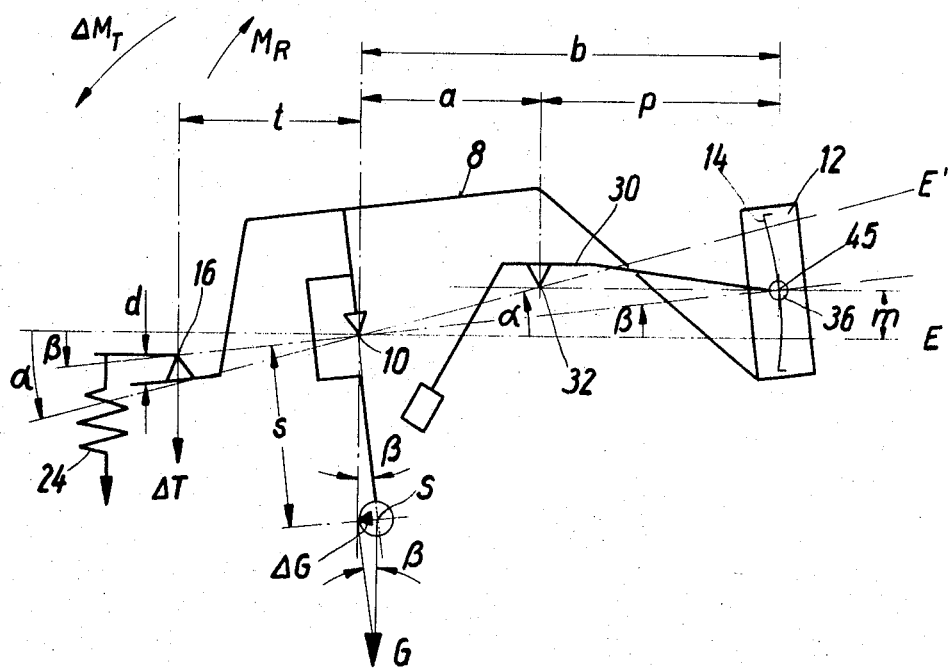
Figure 3:
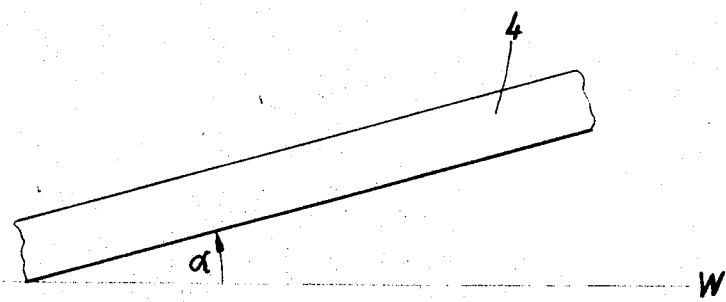

An exemplified embodiment of the invention will be described below with the aid of the drawings, wherein;

FIGS. 1 and 2 are simplified representations of a balance of the invention in side elevation and top view, respectively; and FIG. 3 is a representation of the principle as the basis of the calculation.

The balance of FIGS. 1 and 2 is provided with a balance frame or stand that is designated as a unit by the numeral 2. A base plate 4 and a support 6 belong to the frame. A bracket of support 6 supports a beam 8 with the supporting bearing thereof. The beam is pivotable about its supporting axis 10. At its right-hand end, beam 8 carries a microscale plate 12 with a microscale 14.

The beam is subjected to the load, over its load bearing, along an axis 16 thereof, through a pan support 18 on which a load pan 20 is attached. A bracket 22 of pan support 18 is engaged by a tare spring 24 whose lower end is connected to base plate 4 over a tare spring adjustment device 26.

A pendulum arm 30 is provided in parallel with beam 8, which arm is pivotable about a supporting axis 32 in relation to support 6.

Pendulum arm 30 carries a projecting lens 36 and, on an angular arm section 30a, a light source 38 and a condenser 40. Accordingly, the light source, the condenser and the projecting lens are pivotable jointly with pendulum arm 30. On a further arm 41, to the left from its supporting axis 32, pendulum 30 is provided with a counterweight 42 (FIG.1). The projecting lens 36 reproduces a section of the microscale on a ground-glass screen 44, by means of a mirror 43.

As mentioned above, the effective lengths of beam 8 and pendulum 30 are the distances of their supporting bearings 10 and 32, respectively, to an optical axis 45. The optical axis extends from light source 38, through the center of condenser 40, microscale 14 and the center of projecting lens 36. The effective length of pendulum arm 30 is smaller than that of beam 8.

In this embodiment, each of the three bearing axes 10,16,32 is situated in a common plane E with optical axis 45. Axes 10 and 32 are parallel to each other and axis 32 is displaced laterally in relation to axis 10.

If the balance frame with the base plate 4 thereof (FIGS.3) is tipped by an angle $\alpha$ in the counterclockwise direction, all points of the balance frame outside of the axis of tipping perform movements that may be considered as a pure rotary movement as well as two translation movement components, namely a lifting and a displacement to the left. Since the translation components exert no effect on the turning of the beam and the pendulum, they may be disregarded for the purpose of the following consideration and we can assume that the balance frame was merely tipped about supporting axis 10 of the beam.

In FIGS. 2 and 3:

$b$ = the effective length of beam 8, $a$ = the distance between supporting axis 10 of the beam and supporting axis 32 of the pendulum, $t$ = the distance between supporting axis 10 of the beam and axis 16 of the load bearing, which is the location of effect of force of tare spring 24, $s$ = the distance between supporting axis 10 of the beam and a center of gravity S of the beam mass, If the balance frame is tipped about supporting axis 10 of the beam by the beam by an angle $\alpha$ (exaggerated in the drawings), plane E containing axes 10 and 32 is brought into a position E'. Without the effect of the tare spring beam 8 would retain its original angular position in the space. However, under the effect of the tare spring 24, the beam is turned, namely by an angle $\beta$, which is smaller than angle $\alpha$, since the tare spring is extended under the effect of a beam restoring moment $M_R$. Accordingly, two torques act on the balance beam, balancing each other, namely restoring moment $M_R$ and a torque $\Delta M_T$ produced by the tare spring.

Torque $\Delta M_T$ is produced by a stretching of tare spring 24 by an amount $d$ (FIG. 3) Its magnitude amounts to $$\Delta M_T = t \cdot \Delta T \quad (1)$$

Here, $T$ indicates the increases in the spring power. It is $$\Delta T = d \cdot C \quad (2)$$

wherein $C$ is the spring constant. Otherwise $$d = t \cdot \sin(\alpha - \beta) \approx t (\sin \alpha - \sin \beta) \quad (3)$$

Since we are dealing here with very small angles that are less than 1°, in particular less than 0.2°, the sine, tangent and arc measure may be made equal. This produces the right-hand portion of formula (3) with a sufficient accuracy. When the values from formulas (2) and (3) are inserted in formula (1), we obtain:

$$\Delta M_T = C \cdot t^2 (\sin \alpha - \sin \beta) \quad (4)$$

Center of gravity of $S$ exerts restoring moment $M_R$ on the beam. The weight $G$ of the beam acts in the point $S$. However, only its component $$\Delta G = G \cdot \sin \beta \quad (5)$$

is effective since $\beta$ is the tipping angle of the beam. Thus we obtain for the restoring moment $M_R$ $$M_R = G \cdot \sin \beta \cdot s \quad (6)$$

Since the two torques cancel each other, the following equation $$\Delta M_T = M_R \quad (7)$$

is valid. If we insert values from formulas (4) and (6) into formula (7), we obtain:

$$C \cdot t^2 (\sin \alpha - \sin \beta) = K \cdot s \cdot \sin \beta \quad (8)$$

Through transposition we obtain:

$$\frac{G \cdot s}{C \cdot t^2} = \frac{\sin \alpha - \sin \beta}{\sin \beta} = \frac{\sin \alpha}{\sin \beta} - 1 \quad (9)$$

$$\frac{G \cdot s}{C \cdot t^2} + 1 = \frac{\sin \alpha}{\sin \beta} \quad (10)$$

Now, the length $a$ should be so selected in relation to the length $b$ that lens 36 is lifted by exactly the same amount as microscale plate 12, namely, by a distance $m$. Accordingly, since pendulum 30 retains its angular position in the space, its supporting axis 32 must have been lifted likewise by distance $m$. From FIG. 3 we can read that $$m = a \cdot \sin \alpha = b \cdot \sin \beta \quad (11)$$

$$\sin \alpha / \sin \beta = b/a \quad (12)$$

Finally, if we insert this into formula (10), we obtain $$b/a = G \cdot s / C \cdot t^2 + 1 \quad (13)$$

We can see that the ratio of lengths $b$ and $a$ is not a function of the tare spring power, i.e. it is independent of the tare setting, and it is also independent of tipping angles $\alpha$ and $\beta$. The formula contains merely constants, such as weight $G$ of the beam, spring constant $C$ and distances $t$ and $s$ predetermined by the design.

For the validity of formula (13), it is not required that plane E containing beam supporting axis 10, pendulum supporting axis 32 and optical axis 45 be horizontal in the basic state. Rather, it may also be arranged under an arbitrary angle in relation to such a horizontal. In such a case, pendulum supporting bearing 32 would again move in an arc of circle about beam supporting bearing 10, if the balance frame is tipped. However, the tangent on such an arc of circle would not be perpendicular as in the case of FIGS. 1 and 3, but at a right angle to the said plane. The desired result is attained also in this case: optically effective parts 38, 40 and 36 and, therewith, optical axis 45, are pivoted to the required extent on circular arcs about beam supporting bearing 10, when the balance frame is tilted.

Furthermore, it is not necessary that engagement point 16 of tare spring 24 is situated in plane E.

Independently thereof, image distortions result always from the different sizes of tipping angles $\alpha$ for the microscale and $\beta$ for the projecting lens. Therefore, the invention is to be employed only for the compensation of small tipping effects: less than about 1° or less than even a smaller angle.

It is understood that this invention is susceptible to modifications in order to adapt it to different usages and conditions and, accordingly, it is desired to comprehend such modifications within the invention as may fall within the scope of the appended claims.

What is claimed is:

1. A level compensator for precision and fine balances comprising a balance frame, a balance beam, a support for said beam on said frame, a microscale provided on the beam and a tare spring associated with the beam, a screen and a projection apparatus for the reproduction of a section of the microscale on said screen, the level compensator comprising a pendulum on said balance frame, the support axis of the pendulum being arranged parallel to the support axis of said support of said beam, the projection apparatus being mounted on the pendulum, the effective length of the pendulum arm being shorter than the effective length of the beam arm and the two support axes being so related that when the balance frame is tipped about an axis parallel to the support axes, the pendulum projection apparatus and the microscale are displaced equally in planes parallel to each other.

2. A level compensator as in claim 1, wherein the pendulum support axis is situated proximate a common plane passing through the beam support axis and an optical axis, said optical axis traversing the microscale and the projection apparatus, the level compensation being attained by observing the following requirements:

$$b/a = G \cdot s/C \cdot t^2 + 1$$

wherein:
- $a$ = the distance between beam supporting axis 10 and pendulum supporting axis 32,
- $b$ = the effective length of beam 8,
- $C$ = the spring constant of the tare spring,
- $G$ = the weight of the beam,
- $s$ = the distance between beam supporting axis 10 and center of gravity S of the beam,
- $t$ = the distance between the beam supporting axis 10 and point of engagement 16 of the tare spring force on the beam.

* * * * *